June 14, 1955 A. H. HABERSTUMP 2,710,734
REAR VIEW MIRROR FOR A MOTOR VEHICLE
Filed Dec. 4, 1951
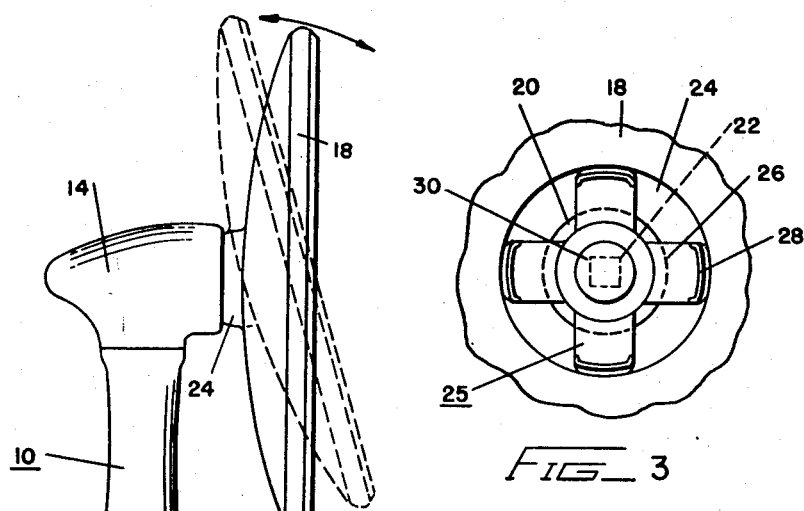
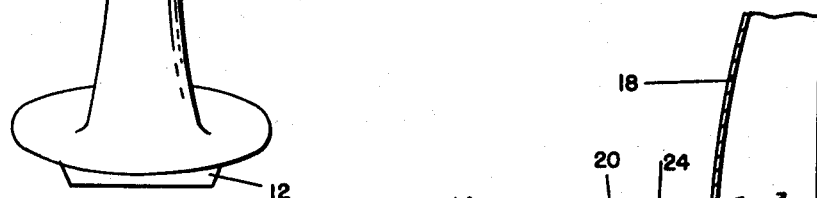
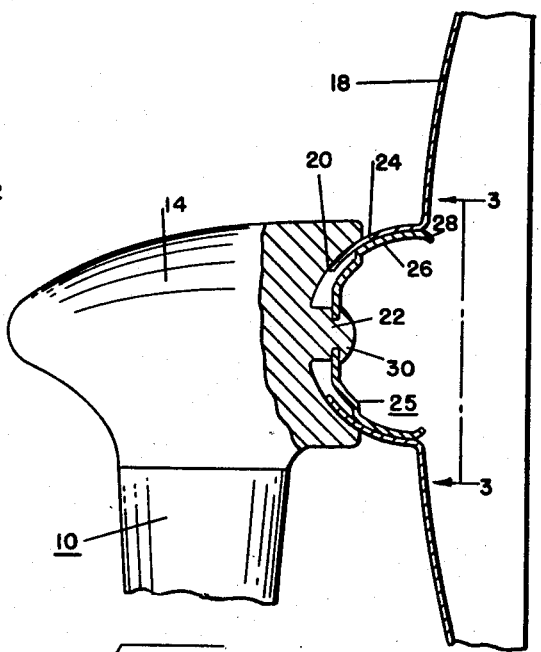
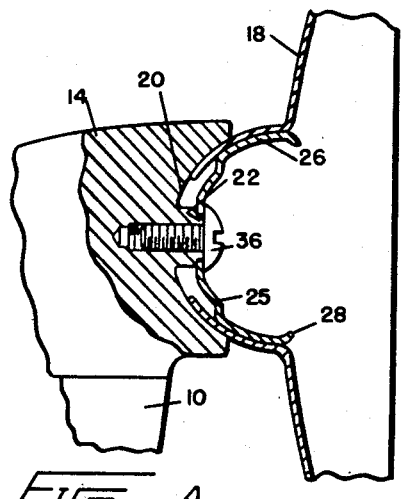
*INVENTOR.*
ALFRED H. HABERSTUMP
BY
ATTORNEY.

United States Patent Office 2,710,734
Patented June 14, 1955

2,710,734

REAR VIEW MIRROR FOR A MOTOR VEHICLE

Alfred H. Haberstump, Detroit, Mich., assignor to George C. Knight Company, Detroit, Mich., a corporation of Michigan Application December 4, 1951, Serial No. 259,814

1 Claim. (Cl. 248—178)

This invention relates to rear view mirrors for motor vehicles, and more particularly to improved angularly adjustable fastening means between a mirror carrying shell and a supporting member.

Rear view mirrors are used extensively to enable a driver to observe road and traffic conditions behind a vehicle. To enable a driver to vary the angular position of the mirror relative to the vehicle, it is customary to provide an angular adjustment between the mirror carrying shell and the mirror supporting member.

An object of this invention is to provide improved connecting means between a mirror carrying shell and a mirror supporting member.

A further object resides in the provision of an improved attaching clip having a plurality of resilient fingers to engage a portion of a mirror carrying shell and urge it into yielding engagement with a mirror supporting member.

Another object of the invention is to provide an improved connection that can be fabricated and assembled economically between a mirror carrying shell and a supporting member.

Still a further object of the invention resides in the provision of a simplified connection for a mirror shell supporting members whereby the angular position of the mirror may be more readily adjusted.

Further objects and advantages of this invention will be apparent from the following description considered in connection with the appended drawings in which:

Figure 1 is an elevational view of a rear view mirror embodying the present invention.

Figure 2 is an enlarged fragmentary view, partly in section, illustrating the invention.

Figure 3 is an elevational view taken substantially on the line 3—37 Figure 2, looking in the direction of the arrows.

Figure 4 is a view similar to Figure 2, illustrating a modified form 7 of the invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to the drawings, it will be noted that a rear view mirror supporting arm or base member 10 has a clamping device 12 whereby it may be secured to the side of a motor vehicle. The clamping device may be of any desired form to clamp the arm or base member 10 to the vehicle, and it will be apparent that the arm or base 10 may be of any desired shape or configuration.

A body member 14 of a rear view mirror head assembly may be mounted on the arm or base 10 for angular movement thereon or the body member 14 may be formed integrally with the arm or base 10.

A mirror carrying shell 18 is mounted for angular movement in a spherical recess 20 of the body member 14. A projection 22 preferably of square cross sectional area as illustrated in Figure 3, extends outwardly from the body member 14 about the middle of the circular recess 20 and projects through a spherical extension 24 formed on the mirror carrying shell 18. A clamping member 25 having a plurality of radially extended resilient tabs 26 generally conforming with the inner contour of the spherical extension 24 of the shell 18 is employed to clampingly engage the shell 18 to the body member 14. The central portion of the clamping member 25 is apertured to permit fastening it to the projection 22 of the body member 14. For example the outer extremity of the projection 22 may be reduced in cross section to receive the clamping member 25, and the end of the projection 22 may be upset or deformed as illustrated at 30 to securely lock the clamping member 25 in place.

The outer extremities of the resilient tabs 26 of the clamping member 25 are deformed inwardly as illustrated at 28 to rigidify the tabs and to provide smooth rounded surfaces over which the contacting surfaces of the spherical extension 24 may slide with a controlled degree of friction which prevents scoring or abrading of the contacting surfaces.

The resilient tabs 26 yieldingly urge the outer surface of the spherical extension 24 into engagement with the surface of the spherical recess 20 formed in the body member 14 with a sufficient force to create a desired degree of friction to hold the shell 18 and mirror in any angularly adjusted position to which it is moved.

To change the angular adjusted position of the mirror relative to the body member 14 and vehicle to which it is attached, the shell 16 is grasped and shifted as illustrated by the double headed arrow in Figure 1 to any desired angular position. As illustrated in Figure 2, it will be noted that as the shell 18 is shifted angularly relative to the body member 14, the terminal edge of the spherical extension 24 contacts the projection 22 of the body member 14 to limit angular movement of the shell before the opposite side of the spherical extension 24 moves out of the spherical recess 20 of the body member 14. A stop to limit angular movement of the shell 18 relative to the body member 14 is thus provided.

Figure 4 illustrates a modified form of the invention wherein a screw 36 is employed to secure the clamping member 25 in place. It will be noted that the projection 22 defines a stop to limit angular deformation of the clamping member to exert a desired degree of tension on the resilient tabs. It will be noted that means are employed to prevent the member 25 from rotating when the mirror is adjusted.

While specific embodiments of my invention have been illustrated and described, it will be apparent that various changes may be made without departing from the spirit of the invention as defined by the following claim.

I claim:

A rear view mirror comprising a mirror carrying shell having a spherical attaching extension, a supporting base adapted to be secured to a motor vehicle and including a body member having a spherical recess to receive the spherical attaching extension of the shell, a projection extending outwardly from the body member centrally of the spherical recess therein, a clamping member having radially extended resilient tabs positioned within the spherical attaching extension of the shell and yieldingly urging the outer surface of the spherical extension of the shell into engagement with the surface of the spherical recess of the body member, and means to secure the clamping member to the body member comprising extending a portion of the projection through the clamping member and peening it over to engage and lock the clamping member to the body member, the clamping member and the portion of the projection extending therethrough being contoured to maintain the clamping member against rotative movement relative to the body member, the extremities of the resilient tabs being contoured inwardly to rigidify the clamping member and to present a smooth surface to engage the inner surface of the spherical attaching extension of the shell as it is moved angularly.

References Cited in the file of this patent

UNITED STATES PATENTS

| | | |
|---|---|---|
| 501,911 | Bergman | July 25, 1893 |
| 1,538,339 | Hodny | May 19, 1925 |
| 1,909,526 | Falge et al. | May 16, 1933 |
| 2,436,678 | Somers | Feb. 24, 1948 |
| 2,533,475 | Koonter | Dec. 12, 1950 |